Patented July 11, 1939

2,166,047

UNITED STATES PATENT OFFICE

2,166,047

PRODUCTION OF BUTANOL AND ACETONE BY THE FERMENTATION OF WHEY

Alfred Frey, Freising, Bavaria, and Hans Glück and Hermann Oehme, Cologne-Kalk, Germany No Drawing. Application February 26, 1938, Serial No. 192,890. In Germany March 8, 1937

8 Claims. (Cl. 195—44)

Our invention concerns the production of butanol and acetone by the fermentation of whey, that is to say the serum containing milk sugar (lactose) obtained from milk after removal of the milk fat and albumen (casein).

Butanol and acetone have already been obtained by fermentation of sugar-containing solutions, for example solutions of cane sugar (saccharose) or waste liquors from the sulphite pulp manufacture, or of wood sugar, or also starch-containing natural products in suitably mashed condition have been directly fermented. The varieties of sugar used or developed in this way, essentially glucose and/or fructose, shows no difficulties in fermentation to butanol and acetone.

From the literature it is to be gathered that pure milk sugar (lactose) shows at the most only half the capacity for fermentation by butanol-forming bacteria as do the usual varieties of sugar which are employed in practice. Lactose is built up from glucose and galactose and it therefore appeared that merely the glucose portion of lactose can be fermented to butanol while the galactose portion remains unfermented.

It was therefore to be expected that in the working up of whey (the serum from milk containing milk sugar) derived in large quantities from milk, up to half could at the most be fermented to butanol.

Our investigations which have been conducted with whey were however at first wholly negative. We used for this purpose a whey of the following composition:

Milk sugar (lactose) _____ per cent__ 4.17
Albumen _____ per cent N__ 0.113
Acid value _____ 0.03
pH _____ 7.08

The albumen materials or nitrogen compounds in the whey are in the following expressed as elementary nitrogen. From this figure the actual quantity can be obtained by the multiplication of the nitrogen quantity by the factor 6.25. The acid value is the number of cubic centimeters of $n$1NaOH required by 20 cubic centimeters.

Three samples of this whey were provided with an addition of bacterial culture which, as previously stated, ferments glucose, saccharose or maltose with outstanding yields to butanol and acetone. In the investigations it appeared that no butanol or acetone were formed; some acid merely resulted. Bacteriological examination showed that the added butanol bacteria had not developed.

We then found that the fermentation of whey to butanol and acetone was in a considerable degree prevented or hindered by the presence of certain dissolved impurities.

Our invention resides in so purifying the whey in advance that the development of the butanol bacteria is not prevented. In particular our invention envisages a reduction of the soluble nitrogen compounds (albumen); it has been found to be satisfactory if the nitrogen compounds have been reduced to a proportion of less than 0.08% N. In general the proportion is reduced to 0.04 to 0.07% N. This whey is, in known manner, inoculated with a culture of butanol bacteria and fermented, whereupon the resulting butanol and acetone are recovered from the fermented whey, for example by distillation. The reduction of the albumen content can be effected by precipitation by means of known albumen-precipitating chemicals.

The precipitation of the albumen can be effected after a preceding neutralization of the acids present in the milk, operation being equally good with only a slightly acid whey or a renneted or sour whey is treated.

We have further established that the dissolved albumen in the whey which interferes with the fermentation of butanol and acetone can also be precipitated by heating.

Accordingly a further feature of our invention consists in a process of heating whey and in this manner reducing the dissolved albumen material to an insignificant quantity. We may utilize for this purpose temperatures of 80–90° C.

A slow increase of temperature is advantageous during the heating as in this way the deleterious albumen materials are precipitated in finely divided form, a stirring with gases being advantageous.

We have further found that this precipitate can be left in the whey and that, similarly to turbidity-producing materials, it exerts a good action upon the development of the bacteria. By "turbidity-producing materials" are to be understood in general certain natural solid materials which are suspended in syrups, mashes, wines, etc. Such suspended materials prevent the sinking of the bacteria and facilitate therefore a uniform distribution of the bacteria in the liquid to be fermented.

The precipitated albumen in finely divided form acts in a similar manner and improves the development of the butanol-forming bacteria.

The precipitated albumen material then remains in the liquid to be fermented. It can in known manner, either before or after the distilling off of the acetone and butanol be separated and recovered from the liquid or the distillation residue respectively. At the same time also the bacteria are separated and their albumen together with the precipitated albumen of the whey can be utilized in any suitable manner.

According to the present process, a practically complete fermentation of the milk sugar in the whey to butanol and acetone is obtained.

This result is surprising, following our initial investigations with whey of a wholly negative character, and since also according to the literature, it was to be expected that at the most half of the milk sugar of the whey, corresponding to the glucose portion, could be fermented substantially to butanol.

So far as the reduction of the solid albumen material content by heating of the whey is concerned, it is further surprising that even a temperature of 90° C. suffices in order so far to reduce the impurification of the whey that this no longer hinders the development of the butanol-forming bacteria. In carbohydrate-containing mashes or mashes from extracted beets, temperatures up to about 90° C. are not sufficient by far to overcome the impurification.

Instead of leaving the precipitated albumen material in the whey it can also be removed by decantation, centrifuging or filtering. It has then, however, appeared advantageous to add to the cleared whey extraneous turbidity-producing materials for example peat dust, residues as obtained in wine production, or the like.

Further features of our invention will be evident from the subsequent examples which however, have no limiting significance. Further embodiments will be apparent to those skilled in the art by simple modification of the foregoing description.

Example 1

*Whey pre-treatment.*—In an enamelled container 1000 liters of whey are heated to 84–90° C., care being taken that the temperature shortly before the commencement of precipitation is only slowly increased. When the precipitation temperature is reached, air, nitrogen or fermentation gas (a gas or gaseous mixture developed by the microörganisms during fermentation) is forced in finely divided form through the whey by means of a suitable device. In this manner the customary large flocks or curded precipitates of whey albumen are wholly prevented. The precipitation is completed in a short time. The albumen exists for the greater part in finely divided form in the serum. Clear-filtered samples show after further heating no additional precipitation. After the precipitation of the albumen the lactic acid is neutralized. With an acid value of 1.09 (ccs. $n$-NaOH for 20 ccs. filtrate), about 2.2 kgs. of dry calcium hydrate to 1 cubic meter are necessary in order to set up the initial acid content to favor the fermentation. The neutralization of the lactic acid is effected directly after the albumen precipitation, the whole being stirred for about 5 minutes as above stated. Thereupon the whey, after reaching the fermentation temperature, is inoculated. Nitrogen content in the filtrate: 65.60 mg. N per 100 ccs.

| Hours | Milk sugar, percent | Acid value in ccs. $\frac{n}{1}$ NaOH per 20 ccs. whey | pH | Albumen mgs. nitrogen per 100 ccs. |
|---|---|---|---|---|
| 0 | 5.23 | 0.06 | 6.23 | 65.78 |
| 48 | 0.69 | 0.64 | 4.94 | 40.87 |

Degree of fermentation_____per cent__ 86.5
Acetone_____kgs. per cubic meter__ 3.2
Butanol_____do____ 15.8
Yield_____per cent__ 90
Proportion of acetone to butanol_____ 1:5

Example 2

1000 liters of whey during heating to about 80–90° C. are brought to an acid value 0.06 by addition of 2.2 kgs. of calcium hydrate. The precipitation of the albumen is then effected as described in Example 1.

| Hours | Milk sugar, percent | Acid value in ccs. $\frac{n}{1}$ NaOH per 20 ccs. whey | pH | Albumen mgs. nitrogen per 100 ccs. |
|---|---|---|---|---|
| 0 | 5.23 | 0.06 | 6.23 | 65.78 |
| 48 | 0.79 | 0.57 | 5.00 | 43.15 |

Degree of fermentation_____per cent__ 85
Acetone_____kgs. per cubic meter__ 2.9
Butanol_____do____ 15.4
Yield_____per cent__ 86
Proportion of acetone to butanol_____ 1:5

Example 3

1000 liters of whey free from precipitated albumen and neutralized are filtered clear and then sterilized after the addition of 10 kgs. of peat dust and are then fermented.

| Hours | Milk sugar, percent | Acid value in ccs. $\frac{n}{1}$ NaOH per 20 ccs. whey | pH | Albumen mgs. nitrogen per 100 ccs. |
|---|---|---|---|---|
| 0 | 5.10 | 0.07 | 6.42 | 67.20 |
| 32 | 2.42 | 0.90 | 4.98 |  |
| 48 | 0.60 | 0.64 | 5.14 | 46.68 |

Degree of fermentation_____per cent__ 88
Acetone_____kgs. per cubic meter__ 3.3
Butanol_____do____ 15.7
Yield_____per cent__ 85
Proportion of acetone to butanol_____ 1:5

Under "degree of fermentation" is to be understood the proportion of fermented to unfermented sugar and under yield the resulting amount of butanol or acetone compared with the highest proportion which can be obtained calculated upon the basis of the fermentation equation.

We claim:
1. Process for the technical production of butanol and acetone by fermentation, which includes the steps of treating whey having a content of dissolved albumen material of less than 0.08% N with a butanol-producing bacteria and recovering butanol and acetone from the treated material.

2. Process for the technical production of butanol and acetone by fermentation which includes the step of reducing soluble albumen content of whey to a value of below 0.08% N, fermenting the whey so treated by addition of butanol-producing bacteria to yield butanol and acetone.

3. Process for the technical production of butanol and acetone by fermentation which includes the step of treating whey with albumen-precipitating agents to bring the content of soluble albumen material to 0.08% N at the most and thereupon fermenting the whey by addition of butanol forming bacteria.

4. Process for the technical production of butanol and acetone by fermentation which includes the step of heating whey until the content of dissolved albumen materials falls by precipitation to below 0.08% N, and then fermenting the whey by addition of butanol forming bacteria.

5. Process for the technical production of butanol and acetone by fermentation which includes the step of heating whey slowly to temperatures between 80–90° C., to form a finely divided suspended precipitate of albumen material and to give a whey the dissolved albumen content of which amounts to less than 0.08% N, adding butanol forming bacteria to the whey containing the precipitate of albumen material and recovering the acetone and butanol from the fermented material.

6. Process for the production of butanol and acetone by fermentation which includes the step of reducing the soluble albumen content of a whey by precipitation to below 0.08% N separating the precipitated albumen material from the whey and fermenting the clear whey by addition of butanol-forming bacteria.

7. Process for the production of butanol and acetone by fermentation which includes the step of reducing the soluble albumen material content of whey to below 0.08% N by precipitation, adding to the whey containing the precipitated albumen material butanol-forming bacteria, and allowing the whey to ferment, the fermented whey being then essentially freed by distillation from butanol and acetone, and the precipitated albumen material together with the bacteria separated from the distillation residue.

8. Processes for the production of butanol and acetone by fermentation which includes the step of slowly heating whey to a temperature between 80°–90° C. and at the same time stirring the whey by passing non-oxidizing gases therethrough, the heating being continued until the content of soluble albumen material amounts to less than 0.8% N, and albumen material is precipitated in finely divided form, and thereafter adding butanol forming bacteria to the whey containing the precipitated albumen material and permitting the whey to ferment.

ALFRED FREY.
HANS GLÜCK.
HERMANN OEHME.